(No Model.)
C. BAILEY.
LAWN CLEANER.
No. 434,233. Patented Aug. 12, 1890.
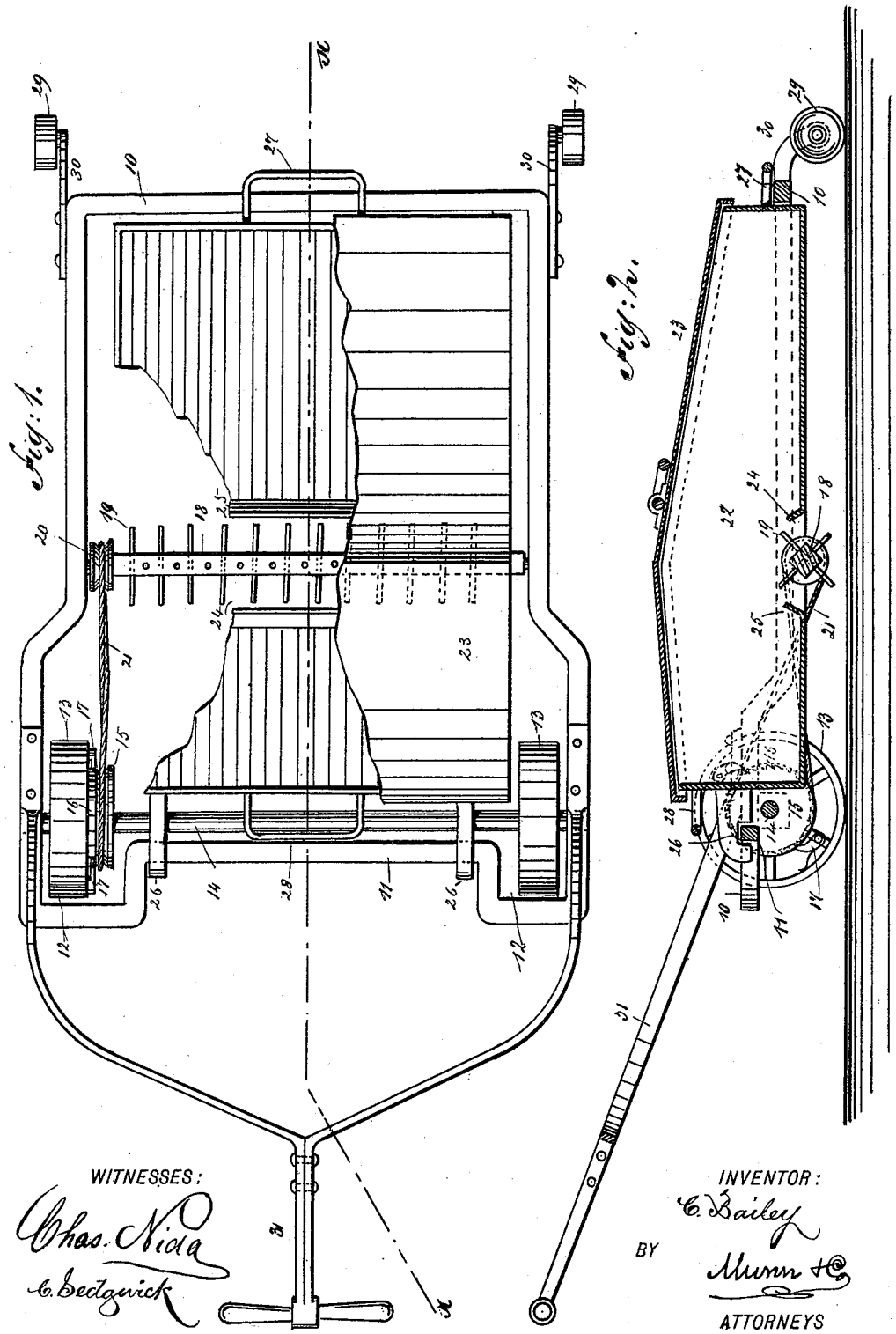
WITNESSES:
Chas. Nida
C. Sedgwick
INVENTOR:
C. Bailey
BY
Munn &Co.
ATTORNEYS

UNITED STATES PATENT OFFICE.

CHARLES BAILEY, OF WINNEPEG, CANADA.

LAWN-CLEANER.

SPECIFICATION forming part of Letters Patent No. 434,233, dated August 12, 1890.

Application filed February 18, 1890. Serial No. 340,879. (No model.)

*To all whom it may concern:*

Be it known that I, CHARLES BAILEY, of Winnepeg, in the Province of Manitoba and Dominion of Canada, have invented a new and useful Improvement in Lawn-Cleaners, of which the following is a full, clear, and exact description.

My invention relates to lawn-cleaners, and has for its object to provide a light and durable machine capable of effectually clearing the refuse—such as grass, leaves, &c.—from lawns, cricket-grounds, tennis-courts, and similar places, and which, when made to follow a lawn-mower, will take up all the grass cut, thereby leaving the lawn or ground perfectly clear.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in both the views.

Figure 1 is a plan view of the machine, the receptacle thereof being partly broken away; and Fig. 2 is a longitudinal section on line $x$ $x$ of Fig. 1.

The frame 10 of the machine is preferably made of bar-iron bent to an essentially rectangular shape, the rear end being wider than the forward end, and the rear bar of the frame being provided with a forwardly-extending offset 11, whereby a pocket 12 is made at each side of the rear portion of said frame, as best shown in Fig. 1. Within these pockets 12 the drive-wheels 13 of the machine revolve, the said wheels being keyed or otherwise secured to a shaft 14, the extremities of which are journaled in any suitable or approved manner to the side bars of the frame. Upon the shaft 14, near one of the drive-wheels, a grooved pulley 15 is mounted, which pulley contacts with the inner face of the drive-wheel near which it is located, and the peripheral surface of the pulley contiguous to the drive-wheel is toothed, as illustrated at 16. This toothed periphery is engaged by two pawls 17, pivoted upon the drive-wheel, the pawls being so arranged that when the machine is pushed forward they will engage with the teeth 16 and revolve the pulley 15, the said pulley being loosely mounted upon the shaft, and when the machine is drawn backward the pawls slip over the teeth and the pulley ceases to revolve. At or near the center of the frame a rake-head 18 is journaled in the side bars, the said rake-head being ordinarily rectangular, as illustrated in Fig. 2, and provided with a series of bores extending through from side to side, which bores are alternately arranged at right angles to each other, and into each of the bores a rake-tooth 19 is introduced and secured, whereby the teeth project at a right angle from each side of the head, as is also best shown in Fig. 2. The head of the rake at the end opposite the grooved pulley 15 has rigidly attached thereto a smaller grooved pulley 20, the two pulleys 20 and 15 being connected by a belt 21. Thus as the machine is advanced a rotary motion is imparted to the rake-head, and the teeth gather up any refuse with which they may come in contact. As the refuse is thrown upward by the rake in revolving, I provide a receptacle 22 for the reception of this refuse, which receptacle is made in the form of a box provided with a detachable cover 23, the said box being of sufficient length and width to neatly fit within the skeleton frame 10. In the bottom of the box a transverse opening 24 is formed, the walls of which are flared upward, as illustrated at 25 in Fig. 2, the said opening being made to receive the rake, as illustrated in Fig. 1, and the said box or receptacle is usually suspended within the frame by attaching arms 26 to the rear end, which arms fit over the crank-arm of the rear bar of the frame, and the receptacle is supported at its forward end by reason of a handle 27, attached to the said end at or near the center, contacting with the top of the front bar of the frame, a similar handle 28 being provided for the rear portion of the receptacle, whereby when the box has been filled or nearly so with grass, leaves, chips, or other refuse the receptacle may be lifted from the frame, the cover removed, and its contents emptied, and the receptacle again replaced without trouble.

In addition to the drive-wheels 13 two smaller wheels 29 are employed, located at the front—one at each side of the frame—and the said wheels are ordinarily journaled in the extremities of arms 30, which are attached to the side bars of the frame and extend beyond its forward end, the said arms being made to curve downward, as illustrated in Fig. 2.

To facilitate the manipulation of the machine a handle 31, having a bifurcated forward end, is employed, the members of the bifurcated portion being rigidly bolted to the side bars of the frame at or near the end of the same. This handle is preferably given an upward and rearward inclination.

Having thus described my invention, I claim as new and desire to secure by Letters Patent—

1. In a lawn-cleaner, the combination of the rectangular frame 10, provided with the pockets 12 at the rear, the shaft 14, journaled in the rear part of the frame, the drive-wheels 13, mounted on the shaft, the pulley 15, mounted upon the shaft adjacent to one of the wheels and having a toothed periphery, pawls 17, pivoted to the drive-wheel and engaging the said pulley, the rake-head 18, journaled in the frame in front of the shaft 14, the pulley 20 on the rake-head, the belt 21, passing around said pulleys, and the receptacle 23, having a transverse opening in its bottom, substantially as herein shown and described.

2. In a lawn-cleaner, the combination, with the supporting-frame mounted on wheels and a rake-head journaled in said frame, of the receptacle 23, having a transverse opening in its bottom, and provided with the handles 27 and 28, and the rearwardly-projecting bars 26, the said receptacle fitting within the frame and supported by the handle 27 and bars 26, substantially as herein shown and described.

CHARLES BAILEY.

Witnesses:
W. H. ROURKE,
G. CASS.